US006826303B2

(12) United States Patent
D'Souza et al.

(10) Patent No.: US 6,826,303 B2
(45) Date of Patent: Nov. 30, 2004

(54) SOFTWARE-BASED ACCELERATION COLOR CORRECTION FILTERING SYSTEM

(75) Inventors: Henry M. D'Souza, Cypress, TX (US); Gokalp Bayramoglu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 502 days.

(21) Appl. No.: 09/893,657

(22) Filed: Jun. 28, 2001

(65) Prior Publication Data

US 2003/0012432 A1 Jan. 16, 2003

(51) Int. Cl.$^7$ .......................... G06K 9/00; G06F 13/00; G06F 3/08

(52) U.S. Cl. ......................... 382/167; 345/590; 358/519

(58) Field of Search ............................. 382/162, 166, 382/167, 254, 260; 345/589, 590, 591, 600, 604; 348/254, 674, 675; 358/1.9, 3.27, 501, 517, 518, 519, 520, 521, 523, 530

(56) References Cited

U.S. PATENT DOCUMENTS

| | | | |
|---|---|---|---|
| 4,857,899 A | | 8/1989 | Ishii |
| 4,982,290 A | * | 1/1991 | Nishi et al. ................... 386/38 |
| 5,070,413 A | | 12/1991 | Sullivan et al. |
| 5,087,966 A | * | 2/1992 | Harradine ................... 348/675 |
| 5,113,294 A | | 5/1992 | Kim |
| 5,132,796 A | * | 7/1992 | Topper et al. ............... 348/674 |
| 5,313,291 A | * | 5/1994 | Appel et al. ................. 358/501 |
| 5,384,901 A | | 1/1995 | Glassner et al. |
| 5,406,310 A | | 4/1995 | Aschenbrenner et al. |
| 5,450,216 A | * | 9/1995 | Kasson ........................ 358/518 |
| 5,479,186 A | | 12/1995 | McManus et al. |

(List continued on next page.)

FOREIGN PATENT DOCUMENTS

WO  WO 00/29935  5/2000

OTHER PUBLICATIONS

Lynda Weinman, *Web Color Calibration Issues*, http://www.webtechniques.com/archives/1998/11/desi/; Oct. 31, 2000, 7 pages.

E–Color™, *An Overview of Technology, Benefits and Opportunities of True Internet Color*, Rev.080800dta, Date Unknown, 11 pgs.

International Electrotechnical Commission, *Colour Measurement and Management in Multimedia Systems and Equipment*, Date Unknown, 19 pgs.

Compaq Inspiration Technology, *Crayola Color Project, Correct Internet Color Project Update and Forward Action Plan*, Jan. 3, 2001, 28 pgs.

Charles Poynton, *Frequently Asked Questions about Color*, http://www.inforamp.net/~poynton/notes/colour_and_gamma/ColorFAQ.html#RTFToC; Dec. 30, 1999, 24 pgs.

Charles Poynton, *Frequently Asked Questions about Gamma*, http://www.inforamp.net/~poynton/notes/colour_and_gamma/ColorFAQ.html#RTFToC; Dec. 30, 1999, 13 pgs.

*Primary Examiner*—Andrew W. Johns
*Assistant Examiner*—Amir Alavi

(57) ABSTRACT

A color correction filtering system filters color video data by compensating for non-linearities and color characteristics specific to a color monitor. Color video data is received by the system, for example through a web browser, and in an accelerated manner passed through a pre-calculated gamut-shifting array. The color correction filtering system gamma decompensates incoming color video data referenced to a non-linear color space through use of a linearization filter. The gamut-shifting array may contain pre-calculated compensation values stored in a plurality of look-up tables. A non-linearization filter is applied to the gamut-shifted color video data to produce color video data compensated for non-linearities specific to the color monitor.

31 Claims, 4 Drawing Sheets

U.S. PATENT DOCUMENTS

| | | | |
|---|---|---|---|
| 5,512,961 A | 4/1996 | Cappels, Sr. | |
| 5,546,101 A | * 8/1996 | Sugawara | 345/63 |
| 5,561,751 A | 10/1996 | Wong | |
| 5,638,117 A | 6/1997 | Engeldrum et al. | |
| 5,652,831 A | 7/1997 | Huang et al. | |
| 5,684,533 A | * 11/1997 | Ishii | 348/254 |
| 5,740,076 A | 4/1998 | Lindbloom | |
| 5,754,222 A | 5/1998 | Daly et al. | |
| 5,821,917 A | 10/1998 | Cappels | |
| 5,838,465 A | * 11/1998 | Satou et al. | 358/520 |
| 5,926,617 A | 7/1999 | Ohara et al. | |
| 5,956,015 A | 9/1999 | Hino | |
| 6,075,888 A | 6/2000 | Schwartz | |
| 6,198,553 B1 | * 3/2001 | Yamamoto et al. | 358/520 |
| 6,388,768 B2 | * 5/2002 | Hada et al. | 358/1.9 |

* cited by examiner $$\begin{bmatrix} R'' \\ G'' \\ B'' \end{bmatrix} = \begin{bmatrix} A & C & D \\ E & F & H \\ I & J & K \end{bmatrix} \begin{bmatrix} R' \\ G' \\ B' \end{bmatrix}$$

Figure 3

$$R'' = (A \times R') + (C \times G') + (D \times B')$$
$$G'' = (E \times R') + (F \times G') + (H \times B')$$
$$B'' = (I \times R') + (J \times G') + (K \times B')$$

Figure 4

|  | | | | | | | | | | | | | | | |
|---|---|---|---|---|---|---|---|---|---|---|---|---|---|---|---|
| R | 0 | 0 | 0 | 0 | 0 | 0 | 0 | 0 | 0 | 0 | 50 | 100 | 150 | 200 | 250 ←502 |
| G | 50 | 100 | 150 | 200 | 250 | 0 | 0 | 0 | 0 | 0 | 0 | 0 | 0 | 0 | 0 |
| B | 0 | 0 | 0 | 0 | 0 | 50 | 100 | 150 | 200 | 250 | 0 | 0 | 0 | 0 | 0 |
| R' | 0 | 0 | 0 | 0 | 0 | 0 | 0 | 0 | 0 | 0 | 11 | 39 | 86 | 154 | 245 ←504 |
| G' | 11 | 39 | 86 | 154 | 245 | 0 | 0 | 0 | 0 | 0 | 0 | 0 | 0 | 0 | 0 |
| B' | 0 | 0 | 0 | 0 | 0 | 11 | 39 | 86 | 154 | 245 | 0 | 0 | 0 | 0 | 0 |
| R" | 2 | 5 | 11 | 20 | 31 | 1 | 2 | 4 | 7 | 11 | 12 | 42 | 94 | 168 | 267 ←506 |
| G" | 10 | 37 | 83 | 149 | 236 | 0 | 0 | -1 | -2 | -3 | 0 | 0 | 1 | 1 | 1 |
| B" | 0 | -1 | -3 | -6 | -10 | 9 | 34 | 75 | 134 | 213 | 0 | 0 | -1 | -2 | -3 |
| R''' | 1 | 22 | 39 | 62 | 84 | 1 | 2 | 18 | 30 | 43 | 46 | 91 | 152 | 201 | 249 ←508 |
| G''' | 42 | 90 | 141 | 191 | 240 | 0 | 0 | 0 | 0 | 0 | 0 | 0 | 0 | 0 | 0 |
| B''' | 0 | 0 | 0 | 0 | 0 | 30 | 89 | 134 | 182 | 230 | 0 | 0 | 0 | 0 | 0 |

Figure 5

$$\begin{pmatrix} 1.092434 & .126263 & 0.041212 \\ 0.002396 & .965119 & -0.01561 \\ -0.91221 & -0.04135 & 0.870848 \end{pmatrix}$$

Figure 6

SOFTWARE-BASED ACCELERATION COLOR CORRECTION FILTERING SYSTEM

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to color management in computer monitors and, in particular but not by way of limitation, to systems and methods for correcting color displayed on computer monitors and to systems for displaying those corrected colors.

2. Background and Related Art

In computer systems, the digital representation of color is in terms of variable mixes of three basic colors: red, green and blue (RGB). The human visual system predictably perceives the close juxtaposition of these three basic colors as one resultant color. This illusion is the basis for color image processing. That is, it possible to manipulate the intensity mix of the three basic constituent colors (red, green, and blue) to cause a viewer to perceive various desired color shades. In fact, a whole range of colors may be perceived in this manner.

In present computer graphics systems, red, green, and blue colors are mixed by a graphics controller that usually handles the intensity control of each basic color using a 6–8 bit control—referred to as an intensity value. Generally, the working range of intensity values are from 0 to 255—0 meaning that the corresponding basic color is completely dark (at 0%) and 225 meaning that the corresponding basic color is at maximum intensity (at 100%). Intensity values between 0 and 255 produce corresponding, but not necessarily, proportional changes in actual displayed brightness for the corresponding color and, thus, corresponding changes in resulting perceived color.

For a high fidelity color system, the monitor must predictably display the correct shade of color that is represented by any mix of red, green and blue. However, a monitor can only display the correct shade of color if the intensities of each color component can be precisely controlled. Present display systems generally lack such precise control and, accordingly, display inaccurate colors. That is, because most computer systems cannot precisely control color intensities, a particular mix of colors may be viewed on one monitor, for example, as blue and on another monitor as blue-green.

In most cases, the variances in basic color points from one monitor to the next are only slight. However, even these small variances can result in a viewer perceiving different colors. The need for each monitor to display the same color is becoming more critical with the growth of web-based commerce. For example, retailers need to provide electronic shoppers with accurate depictions of their products. In particular, clothing retailers need to provide electronic shoppers with accurate colors, i.e., the "true-color", of their products. Unless the retailer can convey the actual color of their products to its customers, those customers likely may become disappointed because the product that they received is different from the product that they thought that they ordered.

Presently, sRGB monitors have the ability to precisely control intensities and, thus, the ability to display accurate colors. sRGB monitors are specially designed to utilize a standard non-linear color space that is reliably consistent across all sRGB monitors. sRGB monitors, however, are very difficult to manufacture and are prohibitively expensive. Accordingly, attempts have been made to adjust typical computer monitors to more accurately display colors. These attempts have generally been less than satisfactory because they require human intervention (thereby interjecting a subjective element to color determination).

Other attempts to correct color deficiencies have similarly proven less than accurate typically as a result of insufficient data. For example, measured monitor specific color response data may not be available and instead color data is only estimated across large batches of manufactured monitors. Likewise, flaws in the monitor specific output measurement itself can cause inaccuracies.

Even with reliable monitor specific data, color correction attempts have proven unsuccessful as a result of system speed requirements. The number and time of processing computations to obtain a corrected output have been prohibitive. For example, video data color filtering for personal computer systems has involved fetching color video data from video memory, performing several multiplication and addition operations on the color video data, and writing the modified color video data back to the video memory. This process has been quite time consuming due to the processing time required for multiplication operations, with each multiplication operation taking on the order of one hundred times that of one addition operation. Since processing time associated with video data color filtering determines how quickly video images are displayed to personal computer users, video data color filtering is even avoided altogether with certain personal computer systems. Other attempts have taken shortcuts through approximation of color values, for example, in order to save valuable computational processing cycles. These shortcuts, however, fail to account for monitor specific color differences and thus result in less than accurate color transformation.

SUMMARY OF THE INVENTION

Briefly, a color correction filtering system filters color video data by compensating for non-linearities and color characteristics specific to a color monitor. Color video data is received by the system, for example through a web browser, and in an accelerated manner passed through a pre-calculated gamut-shifting array. The color correction filtering system gamma decompensates incoming color video data referenced to a non-linear color space through use of a linearization filter. The gamut-shifting array may contain pre-calculated compensation values stored in a plurality of look-up tables. A non-linearization filter is applied to the gamut-shifted color video data to produce color video data compensated for non-linearities specific to the color monitor.

BRIEF DESCRIPTION OF THE DRAWINGS

A better understanding of the present invention can be obtained when the following detailed description of the preferred embodiment is considered in conjunction with the following drawings, in which:

FIG. 3 is an exemplary matrix equation for a gamut-shifting matrix array associated with the multiplication look-up table of FIG. 2;

FIG. 4 is a long-hand matrix equation version of the gamut-shifting matrix array of FIG. 3;

FIG. 5 is a listing of exemplary tristimulus values at each stage through the color correction process of FIG. 2; and FIG. 6 is a set of actual values according to an embodiment of the gamut-shifting matrix array of FIG. 3.

DETAILED DESCRIPTION OF INVENTION

The following related patent applications are hereby incorporated by reference as if set forth in their entirety:

U.S. patent application Ser. No. 09/893,396, entitled "Hardware-Based Acceleration Color Correction Filtering System," filed concurrently;

U.S. patent application Ser. No. 09/499,160, Entitled "METHOD FOR COLOR MANAGEMENT ON A DISPLAY DEVICE," by Henry M. D'Souza, William H. Nott, and Gokalp Bayramoglu, filed Feb. 7, 2000; and U.S. patent application Ser. No. 09/362,080, entitled "Method Apparatus For Computing Optimum Polynomial Coefficients To Represent The Input-Output Characteristics Of A Color Display Device," by Henry M. D'Souza, William H. Nott, and Gokalp Bayramoglu, filed Jul. 27, 1999.

The illustrative system described in this patent application generally provides techniques for accelerated color correction filtering. For purposes of explanation, specific embodiments are set forth by the understanding of the illustrative system. However, it will be understood by one skilled in the art, from reading this disclosure, that the techniques can be practiced without these details. Further, although the embodiments are described in terms of an RGB color scheme, it should be understood that this embodiment is illustrative and is not meant in any way to limit the practice of the disclosed system to an RGB color scheme. Also, the use of Internet images to illustrate how the system works is not intended to infer that the illustrative system requires Internet interface or communication. Rather, any of a variety of input sources may be employed in practicing the techniques described herein. Moreover, well-known elements, devices, process steps and the like, are not set forth in detail in order to avoid obscuring the disclosed system.

Figure 1:
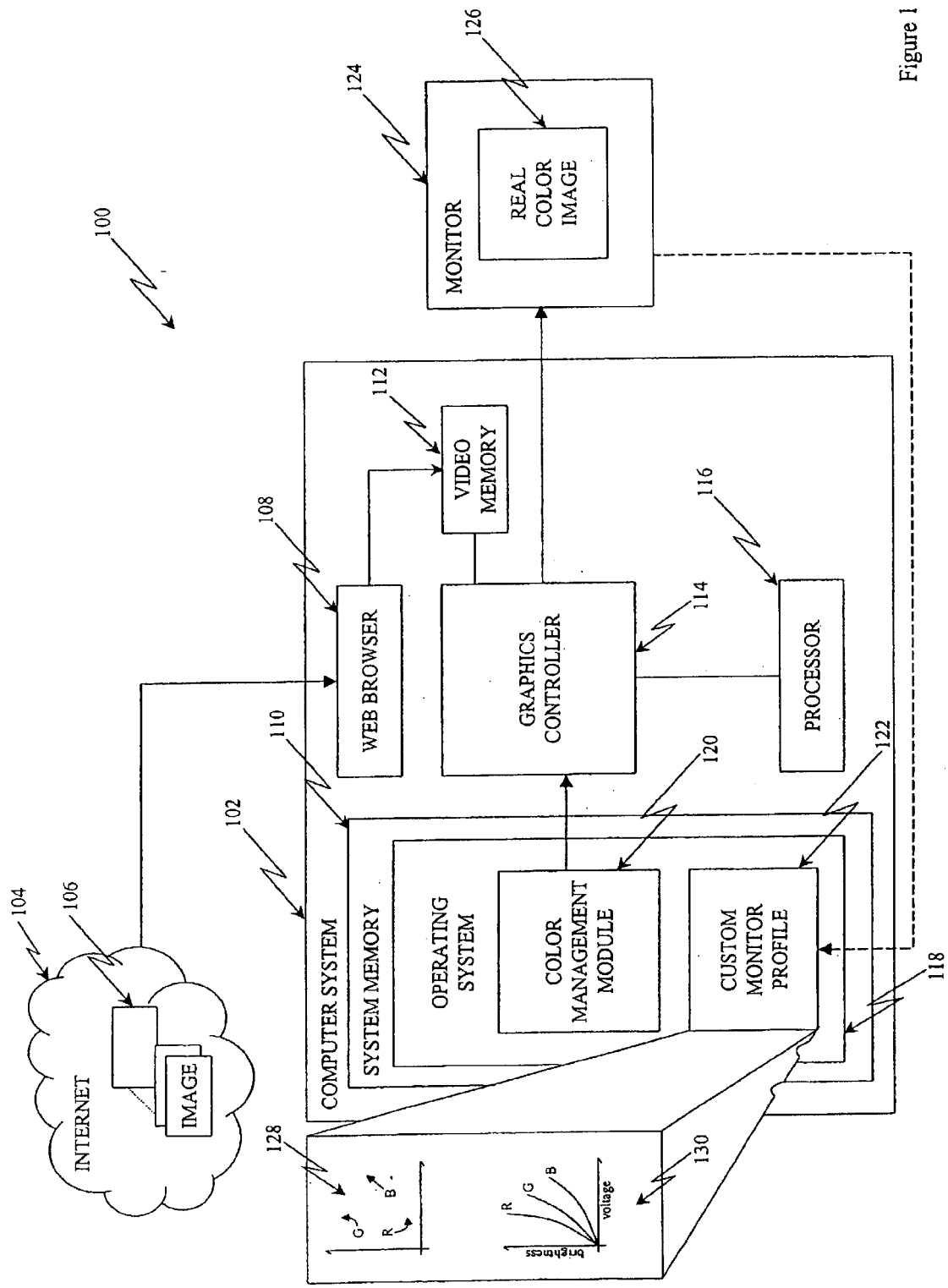
FIG. 1 is a block diagram of an exemplary color correction system.

Referring to FIG. 1, a color correction system 100 is depicted. A web browser application 108 is stored within the computer system 102, such as a desktop personal computer. The web browser 108 receives images 106 through communication with the Internet 104. The computer system 102 contains video memory 112 which receives the color video data of images 106. A graphics controller 114 reads the information stored in the video memory 112 and communicates the image data to a non-linear color monitor 124. According to one embodiment, a color management module 120 is enabled to provide color correction data to the graphics controller 114 for the image data stored in video memory 112. The color correction operates to shift perceived color of the incoming color data to perceived color that is suitable for displaying the output color data on the monitor 124. One exemplary color correction or compensation method and apparatus is disclosed in the commonly-assigned U.S. patent application Ser. No. 09/499,160, entitled "Method For Color Management On A Display Device," incorporated herein by reference in its entirety.

The color management module 120 uses monitor specific color characteristics 128 and monitor specific input-output characteristics 130 to perform color correction for the monitor 124. These characteristics are calculated and stored in the custom monitor profile 122, as part of the operating system 118. Examples of a suitable operating system with color management support is Windows 98, Windows Millennium Edition, or Windows 2000. These operating systems provide Integrated Color Management (ICM) 2.0 APIs (application programming interfaces). The custom monitor profile 122 is auto-generated and registered into the operating system 118 for use by the color management module 120. The monitor specific input-output characteristics 130 stored in the custom monitor profile 122 are used in a number of gamma decompensating look-up tables (discussed in more detail with reference to FIG. 2) to compensate for non-linearities specific to the monitor 124. The monitor specific color characteristics (color point data) 128 stored in the custom monitor profile 122 are used in a number of color filter array look up tables to compensate for color characteristics specific to the monitor 124. In one embodiment, the color point data is expressed in terms of CIE 1931 chromaticity coordinates (each ordered pair represents a specific color stimulus) which define the color gamut of the monitor (i.e., the entire range of perceived color of the monitor).

With the color management module 120 enabled, the processor 116 and graphics controller 114 perform monitor specific color correction on images read from the video memory 112. The details of one exemplary color correction filtering process is more fully described below with reference to FIGS. 2–6. Color corrected data is output from the graphics controller 114 and the computer system 102 to the monitor 124. The monitor 124 then displays the real or true color image 126 which is color corrected according to the specific color characteristics and input-output characteristics of monitor 124. Thus, because the color correction system 100 performs the color correction based on color and input-output characteristics specific to the monitor 124 to which it is coupled, the output of the graphics controller 114 produces a real color image 126 that is consistent and uniform across all non-linear monitors regardless of make, model, or manufacturing inconsistencies causing non-linearities such as differing input-output characteristics. Furthermore, as discussed below, accelerated color correction is achieved through the use of pre-calculated color transform look-up tables. By replacing numerous processing intensive multiplication operations with less processing intensive look-up table operations, the disclosed color correction may be processed at the full rate of the graphics controller 114. In other words, the disclosed color correction system 100 accelerates the rate of color image display.

It is noted that this color correction system can be used for substantially any display device. Such display devices include, but are not limited to, color display devices, VGA (video graphics array) flat panel, liquid crystal display (LCD), reflective LCD and plasma display devices. Furthermore, although the present embodiment discusses images from the Internet, images from various other sources may also be color corrected by system 100. Other possible color image sources include peripheral input devices such as scanners, printers, cameras and photo-shop applications.

Figure 2:
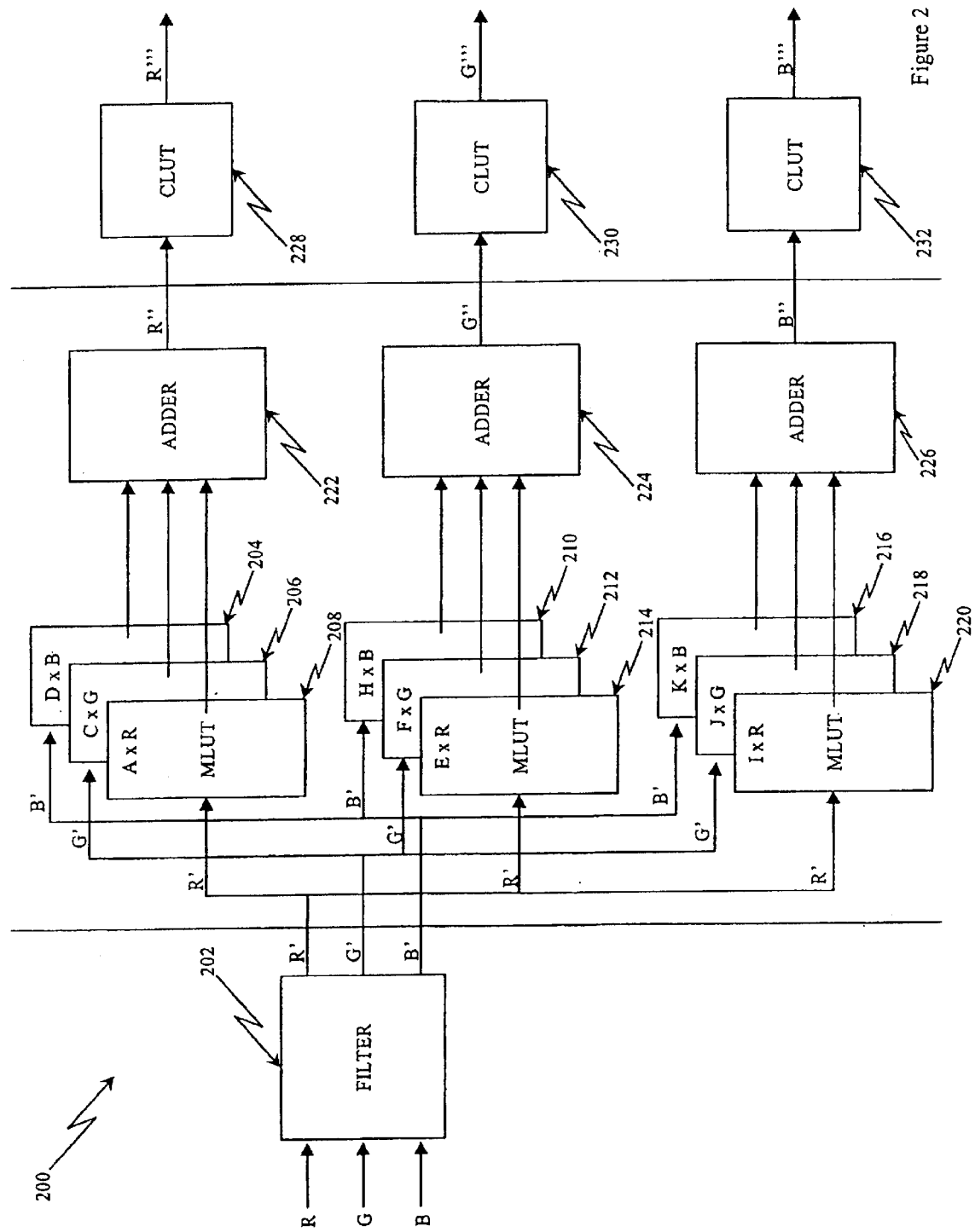
FIG. 2 is a block diagram of a more detailed description of the color correction system of FIG. 1.

Turning to FIG. 2, shown is a more detailed representation of the operation of the graphics controller 114 of FIG. 1. Image data in the form of RGB values, representing the three constituent colors of red, green and blue, is input into a color filter 202. The color filter 202 receives the RGB input and outputs linearized RGB' values. The color filter 202 decompensates for the non-linear RGB input which is based on a standard color image gamma function. The color filter 202 includes a set of linearization tables with each table corresponding to a constituent color. The RGB' linearized values are then input into a gamut shifting array including a number of multiplication look-up tables (MLUTs) 204–220. Each MLUT is loaded with pre-calculated values that represent specific multiplication operations. In other words, each MLUT 204–220 replaces a specific, more time consuming multiplication processing operation.

The set of MLUTs 204–220, and more generally, the 3×3 gamut shifting array or matrix, function to transform the color point data from one color space, such as a standard color space, sRGB, for example, to a color space that is specific to the monitor 124. MLUTs will be discussed in more detail below with reference to FIGS. 3 and 4. The output values from each set of MLUTs 204–220 are then input into a corresponding set of hardware adder devices 222–226. The adders 222–226 sum each of the three MLUT output values to collectively obtain the RGB" output. According to one embodiment, the addition operation is performed by the adders 222–226 when data is requested. Finally, the output of adder devices 222–226 are communicated to a set of non-linearization color look-up tables (CLUTs) 228–232 which perform a final transformation to compensate for monitor specific input/output characteristics, or non-linearities. More generally, other embodiments may utilize one linearization table, one non-linearization table, one adder and one pre-calculated gamut shifting array or a set of pre-calculated gamut shifting arrays per constituent color.

The MLUTs 204–220 represent a three-dimensional look-up table containing pre-calculated RGB component outputs for each of the 256 possible intensities of each primary color. The specific values pre-calculated and loaded into the MLUTs 204–220 are derived from an array representing the product of an array referenced to a standard color space (e.g., sRGB) and an array referenced to the specific color space of the connected monitor.

According to an embodiment, the derivation or these values is calculated according to a detailed multi-equation calculation. First, according to known techniques, input color data along with the maximum brightness for each corresponding color is converted to tri-stimulus data X, Y, Z. This data is then used in column format to make up a 3×3 matrix. This matrix is then inverted and pre-multiplied by a similar matrix made up of standard tristimulus values corresponding to a sRGB monitor. The table values 204–220 of FIG. 2 are then determined by multiplying the resultant filter matrix above into each [R 0 0], [0 G 0] and [0 0 B] possibility where R,G & B each have values from 0–255. In equation form:

Inputs: $x_r, y_r, x_g, y_g, x_b, y_b, x_w, y_w$, where x and y are two dimensional input color CIE chromatically chart coordinates;

$Y_R = a_{3r} \times 0.7^3 + a_{2r} \times 0.7^2 + a_{1r} \times 0.7$ $Y_G = a_{3g} \times 0.7^3 + a_{2g} \times 0.7^2 + a_{1g} \times 0.7$ $Y_R = a_{3b} \times 0.7^3 + a_{2b} \times 0.7^2 + a_{1b} \times 0.7$, where 0.7 is the maximum voltage output of the graphics controller 114. The 0.7 value also represents the maximum input to a display device resulting in the brightest possible intensity for the color channel.

$$X_R = \frac{x_r}{y_r} \times Y_R$$

$$Z_R = \frac{(1 - x_r - y_r)}{y_r} \times Y_R$$

$$X_G = \frac{x_g}{y_g} \times Y_G$$

$$Z_G = \frac{(1 - x_g - y_g)}{y_g} \times Y_G$$

$$X_B = \frac{x_b}{y_b} \times Y_B$$

$$Z_B = \frac{(1 - x_b - y_b)}{y_b} \times Y_B$$

$$\text{Filter Matrix} = \begin{bmatrix} X_R & X_G & X_B \\ Y_R & Y_G & Y_B \\ Z_R & Z_G & Z_B \end{bmatrix}^{-1} \times \begin{bmatrix} X_{Rs} & X_{Gs} & X_{Bs} \\ Y_{Rs} & Y_{Gs} & Y_{Bs} \\ Z_{Rs} & Z_{Gs} & Z_{Bs} \end{bmatrix}$$

$$\begin{bmatrix} A \times R_{(n)} \\ E \times R_{(n)} \\ I \times R_{(n)} \end{bmatrix} = \begin{bmatrix} & \text{filter\_Matrix} & \\ - & - & - \\ - & - & - \end{bmatrix} \begin{bmatrix} R_{(n)} \\ 0 \\ 0 \end{bmatrix}$$

$$\begin{bmatrix} C \times G_{(n)} \\ F \times G_{(n)} \\ J \times G_{(n)} \end{bmatrix} = \begin{bmatrix} & \text{filter\_Matrix} & \\ - & - & - \\ - & - & - \end{bmatrix} \begin{bmatrix} 0 \\ G_{(n)} \\ 0 \end{bmatrix}$$

$$\begin{bmatrix} D \times B_{(n)} \\ H \times B_{(n)} \\ K \times B_{(n)} \end{bmatrix} = \begin{bmatrix} & \text{filter\_Matrix} & \\ - & - & - \\ - & - & - \end{bmatrix} \begin{bmatrix} 0 \\ 0 \\ B_{(n)} \end{bmatrix},$$

where $n \in \{0 \ldots 255\}$.

According to one embodiment, the MLUTs 204–220 can be implemented in hardware as illustrated in FIG. 2. The MLUTs 204–220 compensate for the color characteristic of the monitor 124 with each color channel. Each color channel is passed through one of the corresponding 256-byte look-up tables. Thus, according to a hardware embodiment, the video data is processed through hardware at the speed of the graphics controller 114 (i.e., at a substantially fall video rate), eliminating multiplication operation processing time overhead and permitting substantially real time true color. Alternatively, in another embodiment, the three-dimensional look-up table can be implemented as a software filter to process the bit map data at speeds similar to the hardware application. The software filter is launched at boot up. It initially takes time to read the color characteristics 128 from the monitor 124 via the custom monitor profile 122 and to pre-calculate the look-up tables 204–220. The software filter then stores the look-up tables in the memory 110 or in the custom-monitor profile 122 for fast access. In either case, the hardware or software embodiment, true color output can be obtained at substantially full video rate automatically or alternatively can be observed in response to the touch of a button, for example.

According to one embodiment, each of the values for each MLUT 204–220 are pre-calculated and loaded upon start-up or boot-up of the system 100. According to another embodiment, the pre-calculated MLUT 204–220 values are loaded upon system 100 recognition that a new monitor has been connected to the system 100. The MLUT 204–220 values may also be recalculated and loaded upon user request, such as to provide for changes in monitor color characteristics over time.

Continuing with FIG. 2, RGB' values are fed into corresponding MLUTs. Each value R', G', B' is used as a pointer to a specific value of its corresponding MLUT. For example, the R' input to MLUT 208 will point to one of the values, 0–255 possibilities, contained in MLUT 208. That value will represent the value of the R' input multiplied by the coefficient A. The gamut shifting array of FIG. 3 may also be termed an attenuation and mixing matrix. The gamut-shifting matrix coefficients are discussed in more detail below with respect to FIGS. 3–6. An independent MLUT is provided for each coefficient of the gamut shifting array, such as shown in FIG. 3, also shown with actual coefficient values in FIG. 6. Although, according to the disclosed embodiment of FIG. 2, a total of nine MLUTs are utilized, the number of pre-calculated MLUTs may be of any number such that at least one MLUT is used for every multiplication operation that is replaced.

The equations of FIG. 4 illustrate the longhand version of the matrix equation of FIG. 3. As shown in FIG. 4, the 3×3 matrix of FIG. 3 and FIG. 6 requires a total of nine look-up-tables to replace each of the required multiplication operations shown in FIG. 4. For example, to perform the color correction of R' to R", a sum of coefficient A multiplied by R', plus coefficient C multiplied by G', plus coefficient D multiplied by B', is calculated. A similar calculation is made for G" using coefficients E, F and H and for B" using coefficients I, J and K, as shown in FIG. 4. Each of these nine multiplication operations is pre-calculated and stored into a corresponding 256 byte multiplication look-up table. Because input values of R' consist of a finite data range, 0–255, the multiplication look-up tables 204–220 are also limited to 256-bytes of data. For example, multiplication look-up table 208 replaces the multiplication operation of (A×R') in the equation of FIG. 4. MLUT 208 contains the product of every value of R' multiplied by the coefficient A. The R' input value acts as a pointer for MLUT 208. For example, an input R' value of 33 operates as a pointer within the MLUT 208 to the pre-calculated value of 33 multiplied by the coefficient A, which pre-calculated value is then output from the MLUT 208 to the adder 222 as one of its three inputs.

The combination of the three MLUTs 204–208 along with the adder 222 provides the color transformed output value R". As shown in FIG. 4, R" consists of the sum of three multiplication operations. However, as discussed above, multiplication operations can take up to 100 times the processing time required for a simple addition operation. Each multiplication look-up table replaces each multiplication operation with a much faster pointer/look-up-table operation. The set of gamut shifting array multiplication look-up tables 208, 214 and 220 contain 256 values representing every possible value of the R' input, ranging from 0–255, multiplied by the coefficients A, E and I, respectively. Likewise, the set of gamut shifting array MLUTs 206, 212 and 218 contain 256 byte values representing every value of the G' input, ranging from 0–255, multiplied by the coefficients C, F and J, respectively. Similarly, the set of gamut shifting array MLUTs 204, 210 and 216 contain values representing the value of the B' input, ranging from 0–255, multiplied by the coefficients D, H and K, respectively. From FIG. 4, the resultant nine multiplication look-up tables 204–220 represent each multiplication operation. The adder devices 222–226 perform the summation of the three multiplication operations for each R", G", B" color corrected output. These outputs represent color video data that is compensated for monitor specific primary color chromaticity variations and monitor specific tonal/brightness response non-linearity characteristics. In terms of brightness, R", G" and B" values represent brightness as compared to maximum brightness. These outputs will result in the originally intended image colors being rendered on the specific monitor after conversion to a non-linear color space.

Each of the R", G", B" values are then input into a corresponding non-linearization color look-up table, or CLUT, to compensate the linear input into a non-linear color video data compensated for the specific non-linearities of the monitor 124. A method and apparatus for obtaining monitor specific input/output brightness characteristics is disclosed in the commonly-assigned U.S. patent application Ser. No. 09/362,080, entitled "METHOD APPARATUS FOR COMPUTING OPTIMUM POLYNOMIAL COEFFICIENTS TO REPRESENT THE INPUT-OUTPUT CHARACTERISTICS OF A COLOR DISPLAY DEVICE," incorporated herein by reference in its entirety. Specifically, the original RGB values from web browser 108, intended for monitor 124 are in the form of non-linearized data such as sRGB data. The color compensating matrix operation of FIGS. 3 and 4 is a linear operation. As such, filter 202 functions to convert the RGB data first from a non-linear format to a linear format. This linearization allows application of the linear transform performed by the matrix of FIG. 3. The CLUTs 228–232 then function as non-linearization tables, converting the linear RGB" output to a monitor specific RGB'" non-linear function for reception by the monitor 124.

The CLUTs 228–232 perform the non-linearization transformation according to the monitor specific input-output characteristics 130 stored in the custom monitor profile 122. Specifically, these monitor characteristics are accessed or retrieved from the custom monitor profile 122. The CLUTs 228–232 are then loaded with the appropriate values according to a non-linearization compensation algorithm that takes account of the monitor specific input-output characteristics. One such method of computing the values of a non-linearization CLUT is described in previously incorporated U.S. patent application Ser. No. 09/362,080, entitled "Method Apparatus For Computing Optimum Polynomial Coefficients To Represent The Input-Output Characteristics Of A Color Display Device."

Turning now to FIG. 5, shown are exemplary RGB signal values for the various inputs and outputs of FIG. 2. Each list of values 502–508 is a range of discrete values from 0 to 255 for each R, G, and B tristimulus value. Beginning, the RGB values of 502 represent the input color image data into filter 202. The output of filter 202 for each of the exemplary values of RGB 502 is listed as the linearized data set RGB' 504. These values represent the gamma decompensating function of filter 202. As is understood by a skilled practitioner in the art, the gamma function is standard in the industry for color image representation. However, as discussed in the prior filed commonly-assigned U.S. patent application Ser. No. 09/499,160, entitled "Method And Apparatus For Color Management In Computer Monitors", the gamma function contains significant inaccuracies causing inconsistent color image display. Also as understood by a skilled practitioner in the art, several well known transformations exist to decompensate for gamma-based values. One such transformation is the linearization process set forth in the sRGB specification by International Electrotechnical Commission Draft Number IEC\3WD 61966-2.1 (1998), incorporated herein by reference in its entirety. The filter 202, represented by the RGB' output 504, performs a linearization transformation and compensation on the gamma based input RGB data 502.

The RGB' 504 linearized data is communicated to the series of MLUTs 204–220. Each respective R', G', B' value is utilized as a pointer into the respective multiplication look-up table. For each R', G', and B' value, a total of three multiplication look-up tables is used. Thus, according to an embodiment, the R' value output from filter 202 is input into MLUT 208, 214 and 220. The G value output from filter 202 is likewise input into MLUT tables 206, 212 and 218. Finally, the B value output from filter 202 is input into MLUT tables 204, 210 and 216. For each set of RGB' look-up table inputs, the resultant value is fed to the respective adders 222–226 to obtain the corresponding RGB" values output represented by dataset 506. Thus, the RGB" data values 506 represent color data values that are transformed or shifted from a sRGB color space intended for a sRGB monitor to a color space that is specific to the monitor 124.

The RGB'" dataset 508 is output from the color look-up tables 228–232 to produce RGB' values that are compensated according to monitor specific non-linearities and monitor specific color characteristics. This final compensation process is more fully disclosed in the commonly-assigned U.S. patent application Ser. No. 09/362,080, entitled "Method Apparatus For Computing Optimum Polynomial Coefficients To Represent The Input-Output Characteristics Of A Color Display Device." The difference between the RGB" values 506 and the RGB'" values 508 corresponds to compensation for the specific tonal reproduction characteristic (TRC) for the monitor 124 being used. The TRC can also be described as an input/output brightness characteristic. As discussed in the commonly-assigned, previously incorporated U.S. patent application Ser. No. 09/499,160, entitled "Method For Color Management On A Display Device", the TRC may be a polynomial curve or other mathematical representation, instead of a gamma function. Thus, the RGB'" output value from CLUTs 228–232 are color transformed values representing color image values equivalent to that which would be displayed on an sRGB monitor where only a standard non-linear monitor is available.

Turning now to FIG. 6, shown are actual values for the filter array of FIG. 3, and as expanded in FIG. 4, according to an embodiment. The values of FIG. 6 represent the coefficients A, C–F and H–K of FIGS. 3 and 4. These coefficient values are derived from the color point data 128 stored in the custom monitor profile 122. This color point data 128, according to one embodiment, is in the form chromaticity values which define the color gamut of the specific monitor (i.e., the entire range of perceived color for the monitor). As described above, the matrix values are determined from the color point data 128 according to the above calculations. Suitable values of this gamut shifting array should avoid truncation error. Thus, the RGB' values 504 are mathematically operated as illustrated in FIG. 4 through the summation, via adders 222–226, of three multiplication operations via multiplication look-up tables 204–220, containing the coefficients of FIG. 6, to obtain the RGB" values 506. According to the embodiment of FIG. 6, the MLUTs 204–220 replace processing intensive floating point multiplication operations.

According to an embodiment, the matrix values of the matrix 600 represent the filter array for transforming RGB' values to RGB" values. According to an embodiment, the matrix 600 is a product of four matrices:
(1) a matrix representing an sRGB gamut (tristimulus);
(2) a Bradford transform matrix;
(3) an inverse Bradford transform matrix; and
(4) a matrix representing a gamut of a specific monitor.

The Bradford transform matrix and the inverse Bradford transform matrix can be readily utilized since the Bradford transform is implemented by Microsoft's color management module. However, other embodiments may not utilize the Microsoft color management module, which would then eliminate the need for the Bradford transform matrix and the inverse Bradford transform matrix. Conceptually, the desired product matrix can be viewed as the product of a matrix representing a gamut of a monitor in a desired color space, such as that of an sRGB monitor, and a matrix representing the actual gamut or color space of the specific monitor connected to the system. Although the sRGB color space is the desired color space in one embodiment, other gamuts may be of interest and utilized, such as the gamut of a Corbis monitor (Corbis RGB).

Therefore, with the monitor specific color transformation from RGB' to RGB" to compensate for color characteristics of the monitor 124 and the monitor specific non-linearity compensation to RGB'", a real color image 126 is produced and displayed on monitor 124. These two forms of compensation in combination provide consistent color image display across different display devices. Image data intended for an sRGB display is corrected for display on for a non-sRGB monitor. The result is that the image displayed on the non-sRGB monitor matches the color characteristics of the image if it were displayed on a sRGB monitor before the disclosed color correction.

The color correction is accelerated by avoiding processing intensive and time consuming multiplication operations which would otherwise be required by the various transformations. Multiplication look-up tables are pre-calculated with all possible values of an incoming color component signal, providing a system with minimal processing overhead. In this way, complete color correction filtering is accomplished at substantially full video rates. The accelerated data processing and the attendant accelerated display allow enhanced display capabilities, including, for example, streaming movie images.

The foregoing disclosure and description of the invention are illustrative and explanatory thereof, and various changes in the formulas, monitor types, memory, graphic circuitry, look-up tables, multiplication operations, addition operations, the organization of the components and the order and timing of the steps taken, as well as in the details of the illustrated circuitry and software and hardware and construction and method of operation may be made without departing from the scope and spirit of the invention.

We claim:

1. A software implemented method of color data correction filtering, comprising the steps of:
   gamma decompensating input color video data referenced to a non-linear color space to produce decompensated color video data;
   applying the decompensated color video data through a pre-calculated gamut shifting array representing color characteristics of a color monitor to produce decompensated filtered color video data; and
   compensating the decompensated filtered color video data to produce output color video data compensated for non-linearities and the color characteristics of the color monitor.

2. The method of claim 1, wherein the pre-calculated gamut shifting array comprises a product of an array referenced to the standard non-linear color space and an array representing color characteristics of the color monitor.

3. The method of claim 1, further comprising the step of:
   displaying the output color video data on the color monitor.

4. The method of claim 1, wherein the input color video data is from a website.

5. The method of claim 1, wherein the pre-calculated gamut shifting array is ready upon start up of a computer system.

6. The method of claim 1, wherein the non-linear color space is an sRGB color space.

7. The method of claim 1, wherein the pre-calculated gamut shifting array is stored in a look-up table.

8. The method of claim 1, wherein the step of applying is performed at a substantially full video rate.

9. The method of claim 1, wherein the non-linearities of the color monitor comprise an input-output characteristic for each constituent color of the color monitor.

10. A software-implemented method of color video data filtering, comprising the steps of:
pre-calculating a gamut shifting array representing color characteristics of a non-linear color monitor; and
applying color video data through the pre-calculated gamut shifting array to produce filtered color video data compensated for color characteristics of the non-linear color monitor.

11. The method of claim 10, wherein the pre-calculated gamut shifting array comprises a product of an array referenced to a non-linear color space and an array representing the color characteristics of the non-linear color monitor.

12. The method of claim 10, wherein the non-linear color space comprises an sRGB color space.

13. The method of claim 10, wherein the pre-calculating step is performed upon start up of the computer system.

14. The method of claim 10, wherein the applying step is performed after the color video data is requested for display.

15. The method of claim 10, wherein the pre-calculated gamut shifting array is stored in a look-up table.

16. A software implemented color data correction filtering system, comprising:
a linearization filter means for gamma decompensating input color video data referenced to a non-linear color space to produce decompensated color video data;
a controller means for applying the decompensated color video data through a pre-calculated gamut shifting means representing color characteristics of a color monitor to produce decompensated filtered color video data; and
a non linearization filter means for compensating the decompensated filtered color video data to produce output color video data compensated for non-linearities and the color characteristics of the color monitor.

17. The system of claim 16, wherein the pre-calculated gamut shifting means comprises a product of an array referenced to the standard non-linear color space and an array representing color characteristics of the color monitor.

18. The system of claim 16, wherein the input color video data is from a website.

19. The system of claim 16, wherein the pre-calculated gamut shifting means is ready upon start up of a computer system.

20. The system of claim 16, wherein the non-linear color space is an sRGB color space.

21. The system of claim 16, wherein the pre-calculated gamut shifting means is stored in a look-up table.

22. The system of claim 16, wherein the decompensated color video data is applied through the pre-calculated gamut shifting means at the full speed of the controller means.

23. The system of claim 16, wherein the non-linearities of the color monitor comprise an input-output characteristic for each constituent color of the color monitor.

24. A computer system, comprising:
a processor;
a video memory coupled to the processor;
a color monitor coupled to the video memory; and
a software implemented color data correction filtering system coupled to the video memory and the color monitor, the system comprising:
a linearization filter means for gamma decompensating input color video data referenced to a non-linear color space to produce decompensated color video data;
a controller means for applying the decompensated color video data through a pre-calculated gamut shifting means representing color characteristics of a color monitor to produce decompensated filtered color video data; and
a non linearization filter means for compensating the decompensated filtered color video data to produce output color video data compensated for non-linearities and the color characteristics of the color monitor.

25. The computer system of claim 24, wherein the pre-calculated gamut shifting means comprises a product of an array referenced to the standard non-linear color space and an array representing color characteristics of the color monitor.

26. The computer system of claim 24, wherein the input color video data is from a website.

27. The computer system of claim 24, wherein the pre-calculated gamut shifting means is ready upon start up of a computer system.

28. The computer system of claim 24, wherein the non-linear color space is an sRGB color space.

29. The computer system of claim 24, wherein the pre-calculated gamut shifting means is stored in a look-up table.

30. The computer system of claim 24, wherein the decompensated color video data is applied through the pre-calculated gamut shifting means at the full speed of the controller means.

31. The computer system of claim 24, wherein the non-linearities of the color monitor comprise an input-output characteristic for each constituent color of the color monitor.

* * * * *